United States Patent [19]

Johnson

[11] Patent Number: 5,260,364
[45] Date of Patent: Nov. 9, 1993

[54] SILICONE RUBBER HAVING REDUCED COMPRESSION SET

[75] Inventor: Theodore D. Johnson, Adrian, Mich.

[73] Assignee: Wacker Silicones Corporation, Adrian, Mich.

[21] Appl. No.: 926,011

[22] Filed: Aug. 7, 1992

[51] Int. Cl.$^5$ .................... C08K 3/20; C08K 3/10
[52] U.S. Cl. .................... 524/413; 524/435; 524/588; 524/731; 524/862
[58] Field of Search ............ 524/413, 435, 588, 731, 524/862

[56] References Cited

U.S. PATENT DOCUMENTS

| | | | |
|---|---|---|---|
| 3,697,473 | 10/1972 | Polmanteer et al. | 524/862 |
| 4,002,592 | 1/1977 | Baskin | 524/435 |
| 4,403,060 | 9/1983 | Netherton et al. | 524/413 |
| 4,757,036 | 7/1988 | Kaar | 501/95 |

Primary Examiner—Melvyn I. Marquis
Assistant Examiner—Margaret W. Glass

[57] ABSTRACT

The invention relates to a silicone elastomer having reduced compression set which is obtained by heating a composition comprising:

(a) an organopolysiloxane having an average of at least two Si-bonded aliphatically unsaturated monovalent hydrocarbon radicals, (b) an organohydrogenpolysiloxane having at least two silicon-bonded hydrogen atoms per molecule, a platinum catalyst which is capable of promoting the addition of silicon-bonded hydrogen atoms to the aliphatically unsaturated monovalent hydrocarbon radicals, and (d) an iron-manganese spinel.

to an elevated temperature.

21 Claims, No Drawings

SILICONE RUBBER HAVING REDUCED COMPRESSION SET

The present invention relates to silicon rubber particularly to silicone rubber containing a spinel composition and more particularly to silicone rubber having reduced compression set.

BACKGROUND OF THE INVENTION

It is known from U.S. Pat. No. 3,817,910 to Viksne, that compression set of heat curable silicone rubber can be improved by incorporating alkaline earth metal silicates in curable organopolysiloxane compositions. Spinel compositions, such as iron-manganese spinels are described in U.S. Pat. Nos. 4,604,375 to Soled et. al. and 4,618,597 to Fiato. These spinel compositions are used as catalysts in the conversion of CO/$H_2$ to alpha-olefins.

Therefore, it is an object of the present invention to provide curable organopolysiloxane compositions having reduced compression set. Another object of the present invention is to provide silicone rubber having reduced compression set. Still another object of the present invention is to provide a process for preparing organopolysiloxane compositions which when cured have reduced compression set. A further object of the present invention is to provide a process for preparing silicone rubber having reduced compression set.

SUMMARY OF THE INVENTION

The foregoing objects and others which will become apparent from the following description are accomplished in accordance with this invention, generally speaking by providing heat curable organopolysiloxanes comprising
 (a) an organopolysiloxane having an average of at least two Si-bonded aliphatically unsaturated monovalent hydrocarbon radicals,
 (b) an organohydrogenpolysiloxane having at least two silicon-bonded hydrogen atoms per molecule,
 (c) a platinum catalyst which is capable of promoting the addition of silicon-bonded hydrogen atoms to the aliphatically unsaturated monovalent hydrocarbon radicals, and
 (d) an iron-manganese spinel.

The resultant composition when cured to a silicone elastomeric exhibits reduced compression set.

DESCRIPTION OF THE INVENTION

The organopolysiloxanes employed in the compositions of this invention generally contain recurring units of the formula

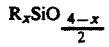   (I)

where R is selected from the group consisting of monovalent hydrocarbon radicals and halogenated monovalent hydrocarbon radicals and x is an integer of from 1 to 3 with an average of from about 1.7 to about 2.1.

It is preferred that the monovalent hydrocarbon radicals and halogenated monovalent hydrocarbon radicals represented by R each contain from 1 to 18 carbon atoms. Examples of suitable hydrocarbon radicals are alkyl radicals, such as the methyl, ethyl, n-propyl, iso-propyl, 1-n-butyl, 2-n-butyl, iso-butyl, tert-butyl, n-pentyl, iso-pentyl, neo-pentyl and tert-pentyl radicals; hexyl radicals such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such a the n-octadecyl radical; alkenyl radicals, such as the vinyl, allyl, methallyl and butadienyl radicals; cycloalkyl radicals, such as the cyclopentyl, cyclohexyl and cycloheptyl radicals and methylcyclohexyl radicals; aryl radicals, such as the phenyl, naphthyl and anthryl and phenanthryl radical; alkaryl radicals, such as o-, m- and p-tolyl radicals, xylyl radicals and ethylphenyl radicals; and aralkyl radicals, such as the benzyl radical and the α- and β-phenylethyl radicals.

Examples of substituted monovalent hydrocarbon radicals represented by R are halogenated hydrocarbon radicals such as the haloalkyl radicals, the 3,3,3-trifluoro-n-propyl radical, the 2,2,2,2',2',2'-hexafluoroisopropyl radical and the heptafluoroisopropyl radical, and haloaryl radicals, such as the o-, m- and p-chlorophenyl radicals.

Examples of hydrocarbon radicals having aliphatic unsaturation are vinyl, allyl, methallyl and butadienyl radicals, with vinyl being the preferred radical.

The organopolysiloxanes employed in the compositions of this invention preferably have a viscosity of from about 5 to 10,000,000 mPa.s at 25° C. and more preferably from about 40 to 1,000,000 mPa.s at 25° C.

The organopolysiloxanes employed herein are produced by the hydrolysis and condensation of the corresponding hydrolyzable silanes. These organopolysiloxanes are preferably linear polymers containing diorganosiloxane units of the formula $R_2SiO$; however these polymers may also contain minor amounts of other units, such as $RSiO_{3/2}$ units, $R_3SiO_{0.5}$ and/or $SiO_{4/2}$ units, in which R is the same as above.

The preferred organopolysiloxane is a diorganopolysiloxane having the formula

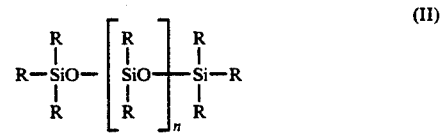   (II)

where R is the same as above with the proviso that an average of at least two R's per molecule are aliphatic unsaturated hydrocarbon radicals having from 2 to 8 carbon atoms such as an alkenyl radical, for example vinyl, allyl, methallyl and butadienyl radicals and n is the same as above.

Examples of organopolysiloxanes which may be employed are dimethylpolysiloxanes, methylphenylpolysiloxanes, methylvinylpolysiloxanes and copolymers of such units, such as copolymers containing dimethyl- and phenylmethylsiloxane units, copolymers containing dimethyl- and methylvinylsiloxane units and copolymers containing phenylmethyl-dimethyl- and vinylmethylsiloxane units. The terminal groups of the organopolysiloxanes may be, for example, trimethylsiloxy groups, dimethylvinylsiloxy groups, dimethylphenylsiloxy groups, trivinylsiloxy groups, allyldimethylsiloxy groups and the like. The organopolysiloxane compositions of this invention may be converted to silicone elastomers by adding an organohydrogenpolysiloxane to an organopolysiloxane containing aliphatic unsaturation in the presence of platinum metals or platinum compounds or complexes.

The organopolysiloxanes are represented by formula (I) above, with the proviso that the organopolysiloxane contains an average of at least two aliphatically unsaturated groups per molecule. The preferred organopolysiloxanes are represented by formula (II) where the terminal units are aliphatically unsaturated groups, such as the vinyl, allyl, methallyl or butadienyl groups.

Organohydrogenpolysiloxanes employed in the compositions of this invention generally consist of units of the general formula $$R'_m SiO_{\frac{4-m}{2}} \qquad (III)$$

where R' represents hydrogen, a monovalent hydrocarbon radical or a halogenated monovalent hydrocarbon radical having from 1 to 18 carbon atoms, in which at least two and preferably three Si-bonded hydrogen atoms are present per molecule and m is 1, 2 or 3. Preferred compounds are those consisting of R'SiO-units, R'$_2$SiO- and R'$_3$SiO$_{0.5}$- units, in which an Si-bonded hydrogen atom is present for each 3 to 100 silicon atoms and R' is the same as above. The examples of the R radicals mentioned above are also examples of the R' radicals. It is preferred that the organohydrogenpolysiloxanes have a viscosity of from about 10 to 50,000 mPa.s and more preferably from 100 to 20,000 mPa.s at 25° C.

The organohydrogenpolysiloxanes may also contain monovalent hydrocarbon radicals having aliphatic unsaturation as well as Si-bonded hydrogen atoms in the same molecule.

It is preferred that the organohydrogenpolysiloxanes contain from 0.002 to about 1.7% by weight of Si-bonded hydrogen atoms, and the silicon valences not satisfied by hydrogen atoms or siloxane oxygen atoms are satisfied by unsubstituted or substituted monovalent hydrocarbon radicals free of aliphatic unsaturation.

The amount of organohydrogenpolysiloxane III employed in the composition of this invention may vary over a broad range. Preferably the amount of organohydrogenpolysiloxane employed may be such that from 0.5 to 5 to 0.8 to 2.0 Si-bonded hydrogen atoms are present per aliphatically unsaturated radical bonded to a silicon atom contained in organopolysiloxane (I). Theoretically, one Si-bonded hydrogen atom is equivalent to one olefinic double bond. For many purposes, however, it may be desirable to employ an excess of either the organopolysiloxane (I) or the organohydrogenpolysiloxane (III) to facilitate the completion of the reaction or to insure that the reaction product still contains either unreacted Si-bonded hydrogen atoms or Si-bonded aliphatically unsaturated groups.

The organohydrogenpolysiloxanes having an average of at least 2 Si-bonded hydrogen atoms per molecule are preferably present in the compositions of this invention in an amount of from about 0.5 to 15 Si-bonded hydrogen atoms per aliphatically unsaturated group.

The platinum catalyst employed in this invention may consist of finely dispersed platinum as well as platinum compounds and/or platinum complexes which have been used heretofore to promote the addition of Si-bonded hydrogen atoms to compounds having aliphatically unsaturated groups.

Examples of catalysts which can be used in this invention are finely dispersed platinum on carriers, such as silicon dioxide, aluminum oxide or activated charcoal, platinum halides, such as PtCl$_4$, chloroplatinic acid and Na$_2$PtCl$_4$·nH$_2$O, platinum-olefin complexes, for example, those with ethylene, propylene or butadiene, platinum-alcohol complexes, platinum-styrene complexes such as those described in U.S. Pat. No. 4,394,317 to McAfee et al. platinum-alcoholate complexes, platinum-acetylacetonate, reaction products comprising chloroplatinic acid and monoketones, for examples, cyclohexanone, methyl ethyl ketone, acetone, methyl-n-propyl ketone, diisobutyl ketone, acetophenone and mesityl oxide, as well as platinum-vinylsiloxane complexes, such as platinum-divinyltetramethyldisiloxane complexes with or without a detectable amount of inorganic halogen. The platinum-vinylsiloxane complexes are described, for example, in U.S. Pat. Nos. 3,715,334; 3,775,452 and 3,814,730 to Karstedt.

Mixtures of various platinum catalysts, for example, a mixture consisting of the reaction product of chloroplatinic acid and cyclohexanone and a platinum-divinyltetramethyldisiloxane complex which is free of detectable inorganic halogen may be used in the compositions of this invention.

The platinum catalyst is generally employed in an amount of from about 0.5 to 300 ppm by weight and more preferably from about 2 to 50 ppm by weight calculated as platinum and based on the weight of the silicone compounds.

The iron-manganese spinels useful in reducing compression set in silicone elastomers have the empirical formula Fe$_y$Mn$_z$O$_4$, where y and z are integer or decimal values, other than zero, with the proviso that the sum of y + z is 3 and the ratio of y/z is above 2:1, preferably from above 2:1 to 19:1 and more preferably the iron to manganese atomic ratio is about 3:1 to 7:1. The spinel exhibits a powder x-ray diffraction pattern substantially isostructural with Fe$_3$O$_4$ and having a surface area greater than about 30 m$^2$/g. The composition can be comprised of a mixture of single phase spinels of different iron-manganese atomic ratios.

The term "spinel" is meant a crystal structure whose general stoichiometry corresponds to AB$_2$O$_4$, where A and B can be the same or different cations. Spinels contain an approximately cubic close-packed arrangement of oxygen atoms with ⅛ of the available tetrahedral interstices and ½ of the octahedral insterstices filled, and can exhibit hundreds of different phases. Further description of the spinel structure can be found in "Structural Inorganic Chemistry" by A.F. Wells, Third Edition, Oxford Press, and the article "Crystal Chemistry and Some Magnetic Properties of Mixed Metal Oxides with the Spinel Structure" by G. Blasse, Phillips Research Review Supplement, Volume 3, pp 1–30 (1964). By the term "isostructural" is meant crystallizing in the same general structure type such that the arrangement of the atoms remain very similar with only minor change in unit cell constants, bond energies and angles. The term "single phase spinel" means one structural and composition formula, corresponding to a single spinel material into which all of the metal components are incorporated, and exhibiting one characteristic x-ray diffraction pattern.

Examples of various spinels corresponding to the formulas are Fe$_{2.85}$Mn$_{0.15}$O$_4$, Fe$_{2.65}$Mn$_{0.375}$O$_4$, and Fe$_{2.25}$Mn$_{0.75}$O$_4$.

In general, the physical properties of the spinels are similar to those of magnetite and include a melting point above 1400° C. and a brownish-red color.

The iron-manganese spinels employed in this invention have a BET surface area of over 30 m$^2$/g and generally from about 50 to 100 m$^2$/g with about 100 m$^2$/g being an average surface area, as determined by the well known BET surface area measurement technique described in the reference JACS 60, p 309 (1938) by S. Brunover, P.H. Emmett, and G. Teller. This range of surface area generally corresponds to a particle size range of from about 100 to 200 angstroms.

The spinels employed in this invention may also contain other metals such as copper, and Group IA and IIA metals such as copper carbonate, copper bicarbonate, copper nitrate and organic and inorganic acid salts, e.g., acetates, nitrates, halides and hydroxide salts of copper and Group IA and IIA metals. The Group IA and IIA metals may be present in an amount of from 0.1 to 10 gram-atom percent of the total gram-atoms of metals present and more preferably from 1 to 2 gram-atom percent of the total gram-atoms of metal present. Generally, the copper metal is present in an amount of from 0.1 to 2 gram-atom percent based on the total metal content and more preferably from about 0.5 to 1.5 gram-atom percent.

The spinels employed in this invention may be prepared by dissolving iron salts and manganese salts, in a water-soluble salt form such as nitrates, sulfates, chlorides, acetates and the like in water. An alpha-hydroxy carboxylic acid is added to the aqueous solution of the iron and manganese salts together with sufficient base such as ammonium hydroxide, sodium hydroxide, or potassium hydroxide to solubilize the resulting acid salts. The amount of base added is sufficient to keep the pH in the range of from 5 to 7. The resultant solution is evaporated, for example by air drying or under reduced pressure at an elevated temperature. The residue from the evaporation step is heated at a temperature of from 100.C and more preferably from 100° to 350° C. for about 1 to 24 hours in air to provide a substantially single spinel phase which is isostructural with Fe$_3$O$_4$.

The amount of spinels employed in this composition is not critical and may vary over a broad range. Thus, the amount of spinels employed may range from about 0.5 to 30% by weight based on the weight of the organopolysiloxane (I) and more preferably from about 1 to 20% by weight based on the weight of the organopolysiloxane (I).

Fillers which may be incorporated in the compositions of this invention are reinforcing fillers, i.e., fillers having a surface area of at least 50 m$^2$/g. Examples of such fillers are precipitated silicon dioxide having a surface area of at least 50 m$^2$/g and/or pyrogenically produced silicon dioxide. Examples of other reinforcing fillers are the aerogels, alumina, carbon blacks and graphite.

A portion of the fillers can be semi- or non-reinforcing fillers, i.e., fillers which have a surface area of less than 50 m$^2$/g. Examples of semi-or non-reinforcing fillers are metal oxides, metal nitrides, cork, organic resins, polytetrafluoroethylene, polychlorotrifluoroethylene, polyvinyl chloride, carbon black, graphite, bentonite, diatomaceous earth, crushed quartz, mica, metal fibers, glass beads, bubbles or fibers and mixtures thereof. Preferred examples of metal oxides are zinc oxide, ferric oxide, alumina and titanium oxide. The fillers may also be treated with, for example, triorganoalkoxysilanes, such as trimethylethoxysilane to coat the surfaces with organosiloxy groups.

The amount of fillers which may be incorporated in the compositions of this invention is not critical and may vary over a wide range. Thus, the amount of filler may range from about 1 to 80% by weight, preferably from about 5 to 75% by weight, and more preferably from about 10 to 50% by weight, based on the weight of the composition, i.e., the weight of the organopolysiloxane, the organohydrogenpolysiloxane, the platinum catalyst, the spinel and the filler.

Other additives which may be incorporated in the compositions of this invention include pigments, other compression set additives, oxidation inhibitors, plasticizers, adhesion promoters, base stabilizer and other materials commonly employed as additives in the silicone rubber art. Such additives are preferably present in an amount below about 15% by weight based on the weight of the composition.

In the preparation of the organopolysiloxane compositions of this invention, the organopolysiloxane (I) containing aliphatic unsaturation may be mixed with the organohydrogenpolysiloxane (III), the spinel and then the desired amount of platinum catalyst is added, or the organopolysiloxane (I) may be mixed with the desired amount of platinum catalyst and spinel and then the organohydrogenpolysiloxane (III) is added. A preferred method is to premix the platinum catalyst with the organopolysiloxane (I) having aliphatic unsaturation and then combine the resultant mixture with the spinel and then the organohydrogenpolysiloxane (III).

The compositions of this invention may be prepared by mixing the components on a roller mill, a kneader or a Banbury mixer.

Generally, these compositions are heated to temperatures of from about 50° to 300° C. and more preferably to a temperature of from 100° to 200° C. to form the silicone elastomers. The time required for cross-linking varies depending on such things as the reactants employed and the amount and type of catalyst employed.

In some cases, it is desirable to employ a diluent for the catalyst and/or reactants. The diluent should be inert to the reactants and catalyst under the reaction conditions. Examples of suitable diluents are organopolysiloxanes such as trimethylsiloxyterminated dimethylpolysiloxanes and organic solvents which vaporize at low temperatures. Examples of suitable organic solvents are chlorinated hydrocarbons such as trichloroethylene. When organic solvents are employed, they are preferably employed in an amount of less than 20% by weight based on the weight of the organopolysiloxane composition.

The addition of the Si-bonded hydrogen atoms to the aliphatically unsaturated groups may be inhibited or at least controlled by the addition of other inhibitors to the composition. Various compounds which may be used to inhibit platinum catalyzed addition reactions are benzotriazole; acetylenic compounds such as acetylenically unsaturated secondary or tertiary alcohols and siloxanes such as 1,3-divinyl1,1,3,3-tetramethyl-disiloxane. Other compounds which may be employed are tetramethylquanidine acetate, ethylenically unsaturated isocyanurate, phenylhydrazine, a diaziridine, dithiocarbamic acids, thiuram monosulfides, hydrazone 2-mercaptobenzothiazole and the like.

The amounts of inhibitor used may be varied depending on such characteristics as the type and amount of platinum catalyst used, the degree of inhibition desired to be imparted to the platinum catalyst and often the type of unsaturated polysiloxane and hydrogenpolysiloxane employed. Generally, the amount of inhibitor employed can range from about 0.001 to 6% by weight and more preferably from about 0.01 to about 5% by weight based on the weight of the composition.

The compositions of this invention can be used for any application where heat curing is possible. These compositions are especially useful as coating compositions and as encapsulating materials for semiconductors. In addition, these compositions may be used as adhesive repellent coatings and as fabric coatings. Also, these compositions may be used in injection molding equipment.

The heat curable organopolysiloxane compositions of this invention have excellent storage stability at room temperature. In addition, the curing system of this invention can serve to control the rate of curing of a platinum catalyzed curing system.

In the following examples, all parts are by weight unless otherwise specified and the parts of platinum catalyst are based on the weight of elemental platinum. All temperatures are at 25° C. unless otherwise stated.

Preparation of Platinum Compounds (A) Preparation of platinum-vinylsiloxane complex.

About 20 parts of sodium bicarbonate were added to a mixture containing 10 parts of $H_2PtCl_6 \cdot 6H_2O$ 20 parts of 1,3-divinyl-1,1,3,3-tetramethyldisiloxane and 50 parts of ethanol. The mixture was heated for 30 minutes to boiling under reflux while stirring, then allowed to stand for 15 hours and subsequently filtered. The volatile constituents were distilled off from the filtrate at about 16 hPa (abs.) About 17 parts of a liquid were obtained as residue and the liquid was dissolved in benzene. The solution was filtered and the benzene was distilled off from the filtrate. The residue was blended with a dimethylpolysiloxane having dimethylvinylsiloxane units as terminal units and having a viscosity of 1400 mPa.s at 25° C. as diluent, in an amount such that the mixture contains 0.1% by weight of platinum, calculated as the element.

(B) Preparation of dicyclopentadiene-platinum dichloride.

About 0.2 g of dicyclopentadiene-platinum dichloride is dissolved in 20 ml of methylene chloride. The solution is mixed with a dimethylpolysiloxane having terminal vinyldimethylsiloxy units and a viscosity of 1000 mPa.s at 23° C. The mixture is stirred at room temperature and at 1 bar until the methylene chloride evaporates. The resultant mixture contains 0.12% of platinum, calculated as elemental platinum.

(C) Preparation of ammonium platinum complex.

An aminofunctional silicone composition is prepared by heating a mixture containing about 226.4 parts of octamethylcyclotetrasiloxane, 22.4 parts of β-(aminoethyl)-gamma-aminopropyltrimethoxysilane and 0.29 parts of potassium hydroxide to a temperature of 145° C. for three hours. After cooling the liquid product to room temperature, 0.29 parts of acetic acid are added to neutralize the potassium hydroxide. The product is filtered and a liquid product having a viscosity of about 40 mPa.s at 25° C. is recovered. About 28.8 parts of the aminofunctional silicone composition prepared above are added to a reactor under an atmosphere of nitrogen. About 100 parts of isopropanol, 1.04 parts of chloroplatinic acid hexahydrate, and 45 parts of toluene are added to the reactor and the reaction mixture is stirred for 30 minutes at 27° C. The resultant transparent orange colored product contains 0.16% by weight of platinum.

EXAMPLE 1

Organopolysiloxane compositions are prepared by mixing an organopolysiloxane with a platinum catalyst, fumed silica and an iron-manganese spinel at room temperature. The resultant mixture is then mixed with an organohydrogenpolysiloxane for about ten (10) minutes and then molded. The formulations are shown in Table I.

TABLE I

| Ingredients | Formulations, parts | |
|---|---|---|
| | A | A' |
| Dimethylpolysiloxane, vinyl terminated (20,000 mPa · s) | 50.3 | 50.3 |
| Fumed silica | 19.7 | 19.7 |
| Ground quartz | 28.3 | 28.3 |
| Iron-manganese spinel (Ferro F-6331) | 1.0 | — |
| Methylhydrogenpolysiloxane (0.23 weight percent silicon-bonded hydrogen - 50 mPa · s | 1.6 | 1.6 |
| Platinum catalyst (A) | .00068 | .00068 |

TABLE II

| Ingredients | Formulations, parts | |
|---|---|---|
| | B | B' |
| Dimethylpolysiloxane, vinyl terminated (20,000 mPa · s) | 55.8 | 55.8 |
| Fumed silica | 15.3 | 15.3 |
| Ground Quartz | 27.8 | 27.8 |
| Iron-manganese spinel (Ferro F-6331) | 1.0 | — |
| Methylhydrogenpolysiloxane (0.23 weight percent silicon-bonded hydrogen - 50 mPa · s) | 1.2 | 1.2 |
| Platinum catalyst (A) | .00042 | .00042 |

Each of the formulations shown in Tables I and II are molded and cured for 5 minutes at 177° C. The physical properties of the cured formulations are illustrated in Table III.

TABLE III

| Physical Properties | Formulations | | | |
|---|---|---|---|---|
| | A | A' | B | B' |
| Tensile strength, (p.s.i.) | 1076 | 1151 | 705 | 581 |
| 100% Modulus, (p.s.i.) | 515 | 565 | 204 | 228 |
| Elongation, (%) | 314 | 302 | 391 | 295 |
| Tear Die B, (p.p.i.) | 130 | 123 | 208 | 190 |
| Durometer, Shore A | 71 | 71 | 50 | 50 |
| Compression Set, (%) 22 hours/177° C. | 31 | 60 | 34 | 59 |

EXAMPLE 2

The following formulations are prepared in accordance with the procedure described in Example 1. The formulations are shown in Table IV.

TABLE IV

| Ingredients | Formulations, parts | | | |
|---|---|---|---|---|
| | C | C' | D | D' |
| Dimethylpolysiloxane, vinyl terminated (20,000 mPa · s) | 71.6 | 71.6 | 69.8 | 69.8 |
| Fumed silica | 26.2 | 26.2 | 27.8 | 27.8 |
| Iron-manganese spinel (Ferro F-6331) | 1 | — | 1 | — |

TABLE IV-continued

| Ingredients | Formulations, parts | | | |
|---|---|---|---|---|
| | C | C' | D | D' |
| Methylhydrogenpolysiloxane (0.23 weight percent silicon bonded hydrogen - 50 mPa · s) | 2.2 | 2.2 | 2.4 | 2.4 |
| Platinum catalyst (A) | .00065 | .00065 | .00099 | .00099 |

Each of the formulations shown in Table IV are molded and cured for 5 minutes at 177° C. The physical properties of these cured formulation are illustrated in Table V

TABLE V

| Physical Properties | Formulations | | | |
|---|---|---|---|---|
| | C | C' | D | D' |
| Tensile strength, (p.s.i.) | 923 | 1088 | 1292 | 1355 |
| 100% Modulus, (p.s.i.) | 78 | 86 | 242 | 264 |
| Elongation, (%) | 585 | 605 | 450 | 369 |
| Tear Die B, (p.p.i.) | 92 | 90 | 243 | 183 |
| Durometer, Shore A | 32 | 35 | 54 | 57 |
| Compression Set, (%) | | | | |
| 22 hours/177° C. | 18 | 52 | 46 | 72 |
| 70 hours/177° C. | 38 | 56 | 77 | 91 |

The molded formulations are heated for 5 minutes at 177° C. and then oven cured for 1 hour at 177° C. The physical properties are illustrated in Table VI

TABLE VI

| Physical Properties | Formulations | | | |
|---|---|---|---|---|
| | C | C' | D | D' |
| Tensile strength, (p.s.i.) | 1210 | 1249 | 1174 | 1099 |
| 100% Modulus, (p.s.i.) | 88 | 93 | 265 | 308 |
| Elongation, (%) | 638 | 610 | 390 | 299 |
| Tear Die B, (p.p.i.) | 97 | 154 | 248 | 190 |
| Durometer, Shore A | 32 | 35 | 54 | 59 |
| Compression Set, (%) | | | | |
| 22 hours/177° C. | 16 | 40 | 49 | 40 |
| 70 hours/177° C. | 38 | 60 | 76 | 70 |

EXAMPLE 3

The following formulations are prepared in accordance with the procedure described in Example 1. The formulations are shown in Table VII

TABLE VII

| Ingredients | Formulations, parts | |
|---|---|---|
| | E | E' |
| Dimethylpolysiloxane, vinyl terminated (20,000 mPa · s) | 68.4 | 68.4 |
| Fumed silica (Min-U-Sil) | 30.5 | 30.5 |
| Iron-manganese spinel (Ferro F-6331) | 1 | — |
| Methylhydrogenpolysiloxane (0.23 weight percent silicon-bonded hydrogen - 50 mPa · s) | 1.1 | 1.1 |
| Platinum catalyst (A) | .00046 | .00046 |

Each of the formulations shown in Table VII are molded and cured for 5 minutes at 177° C. The physical properties of these formulations are illustrated in Table VIII

TABLE VIII

| Physical Properties | Formulations | |
|---|---|---|
| | E | E' |
| Tensile strength, (p.s.i.) | 1193 | 1352 |
| 100% Modulus, (p.s.i.) | 106 | 131 |

TABLE VIII-continued

| Physical Properties | Formulations | |
|---|---|---|
| | E | E' |
| Elongation, (%) | 833 | 769 |
| Tear Die B, (p.p.i.) | 248 | 231 |
| Durometer, Shore A | 37 | 43 |
| Compression Set, (%) | | |
| 22 hours/177° C. | 39 | 69 |
| 70 hours/177° C. | 67 | 81 |

The molded formulations are heated for 5 minutes at 177° C. and then oven cured for 1 hour at 177° C. The physical properties are illustrated in Table IX.

TABLE IX

| Physical Properties | Formulations | |
|---|---|---|
| | E | E' |
| Tensile strength, (p.s.i.) | 1152 | 1283 |
| 100% Modulus, (p.s.i.) | 106 | 139 |
| Elongation, (%) | 748 | 710 |
| Tear Die B, (p.p.i.) | 250 | 243 |
| Durometer, Shore A | 37 | 43 |
| Compression Set, (%) | | |
| 22 hours/177° C. | 32 | 58 |
| 70 hours/177° C. | 71 | 74 |

EXAMPLE 4

The procedure of Example 1 is repeated except that 0.0012 parts of the platinum catalyst prepared according to (B) above as platinum metal are substituted for the platinum catalyst (A). The physical properties of the molded and cured formulations are essentially the same as those shown in Table III.

EXAMPLE 5

The procedure of Example 1 is repeated except that 0.002 parts of the platinum catalyst prepared according to (C) above as platinum metal are substituted for the platinum catalyst prepared according to (A) above. The physical properties of the molded and cured formulations are essentially the same as those shown in Table III.

What is claimed:

1. An organopolysiloxane composition which is capable of curing to an elastomer having reduced compression set which comprises:
   (a) an organopolysiloxane having an average of at least two silicon-bonded aliphatically unsaturated hydrocarbon radicals per molecule;
   (b) an organohydrogenpolysiloxane having an average of at least two silicon-bonded hydrogen atoms per molecule;
   (c) a platinum catalyst which is capable of promoting the addition of Si-bonded hydrogen atoms to aliphatically unsaturated hydrocarbon radicals; and
   (d) an iron-manganese spinel having an empirical formula $Fe_y-Mn_z-O_4$ where y and z have integer or decimal values other than zero, with the proviso that the sum y+z is 3 and the ratio of y/z is from 3:1 to 19:1.

2. The composition of claim 1, wherein the organopolysiloxane (a) contains recurring units of the formula $$R_xSiO_{\frac{4-x}{2}}$$

where R is selected from the group consisting of monovalent hydrocarbon radicals having from 1 to 18 carbon atoms and halogenated monovalent hydrocarbon radicals having from 1 to 18 carbon atoms, in which an average of at least two of the monovalent hydrocarbon radicals contain aliphatic unsaturation per molecule and x is an integer of from 1 to 3, with an average value of from about 1.7 to about 2.1.

3. The composition of claim 1, wherein the organopolysiloxane (a) has a viscosity of from 5 to 10,000,000 mPa.s at 25° C/

4. The composition of claim 1, wherein the organohydrogenpolysiloxane (b) has the formula $$R'_m SiO_{\frac{4-m}{2}}$$

where R' is selected from the group consisting of hydrogen, a monovalent hydrocarbon radical and a halogenated monovalent hydrocarbon radical, in which an average of at least two Si-bonded hydrogen atoms are present per molecule and m is 1, 2 or 3.

5. The composition of claim 1, wherein the organohydrogenpolysiloxane (b) has a viscosity of from 10 to 50,000 mPa.s at 25° C.

6. The composition of claim 1, wherein the organopolysiloxane composition contains a filler.

7. The composition of claim 1, wherein the iron-manganese spinel (d) has a ratio of y/z of from 3:1 to 7:1.

8. The composition of claim 1, wherein the iron-manganese spinel (d) has the formula $Fe_{2.85}Mn_{0.15}O_4$, $Fe_{2.25}Mn_{0.75}O_4$, or $Fe_{2.625}Mn_{0.375}O_4$.

9. The composition of claim 1, wherein the iron-manganese spinel (d) is a mixture of iron-manganese spinels of different iron-manganese atomic ratios.

10. A process for reducing the compression set of an elastomer which comprises (1) mixing an iron-manganese spinel having an empirical formula $Fe_y Mn_z O_4$ where y and z have integer or decimal values other than zero, with the proviso that the sum y+z is 3 and the ratio of y/z is from 2:1 to 19:1 with an organopolysiloxane composition containing:
   (a) an organopolysiloxane having an average of at least two silicon-bonded aliphatically unsaturated hydrocarbon radicals per molecule;
   (b) an organohydrogenpolysiloxane having an average of at least two silicon-bonded hydrogen atoms per molecule and
   (c) a platinum catalyst which is capable of promoting the addition of Si-bonded hydrogen atoms to aliphatically unsaturated hydrocarbon radicals and (2) curing the resultant composition to an elastomer.

11. The process of claim 10, wherein the organopolysiloxane (a) contains recurring units the formula $$R_x SiO_{\frac{4-x}{2}}$$

where R is selected from the group consisting of monovalent hydrocarbon radicals having from 1 to 18 carbon atoms and halogenated monovalent hydrocarbon radicals having from 1 to 18 carbon atoms, in which an average of at least two of the monovalent hydrocarbon radicals contain aliphatic unsaturation per molecule and x is an integer of from 1 to 3, with an average value of from about 1.7 to about 2.1.

12. The process of claim 10, wherein the organopolysiloxane (a) has a viscosity of from 5 to 10,000,000 mPa.s at 25° C.

13. The process of claim 10, wherein the organohydrogenpolysiloxane (b) has the formula $$R'_m SiO_{\frac{4-m}{2}}$$

where R' is selected from the group consisting of hydrogen, a monovalent hydrocarbon radical and a halogenated monovalent hydrocarbon radical, in which an average of at least two Si-bonded hydrogen atoms are present per molecule and m is 1, 2 or 3.

14. The process of claim 10, wherein the organohydrogenpolysiloxane (b) has a viscosity of from 10 to 50,000 mPa.s at 25° C.

15. The process of claim 10, wherein the organopolysiloxane composition contains a filler.

16. The process of claim 10, wherein the iron-manganese spin has a ratio of y/z of from 3:1 to 19:1.

17. The process of claim 10, wherein the iron-manganese spinel has a ratio of y/z of from 3:1 to 7:1.

18. The process of claim 10, wherein the iron-manganese spinel (d) has the formula $Fe_{2.85}Mn_{0.15}O_4$, $Fe_{2.25}Mn_{0.75}O_4$, or $Fe_{2.625}Mn_{0.375}O_4$.

19. The process of claim 1, wherein the iron-manganese spinel (d) is a mixture of iron-manganese spinels of different iron-manganese atomic ratios.

20. The process of claim 10, wherein the organopolysiloxane composition is heated to a temperature up to about 300° C.

21. The process of claim 20, wherein the organopolysiloxane composition is heated to a temperature of from 50° to 300° C.

* * * * *